United States Patent [19]

Kashiwabara

[11] Patent Number: 5,628,705
[45] Date of Patent: May 13, 1997

[54] APPARATUS FOR CONTROLLING CONTINUOUSLY VARIABLE TRANSMISSION AND METHOD THEREOF

[75] Inventor: Masuo Kashiwabara, Atsugi, Japan

[73] Assignee: Unisia Jecs Corporation, Kanagawa-ken, Japan

[21] Appl. No.: 572,902

[22] Filed: Feb. 12, 1996

[30] Foreign Application Priority Data

Feb. 14, 1995 [JP] Japan .................. 7-025098

[51] Int. Cl.$^6$ .................. B60K 41/12
[52] U.S. Cl. .................. 477/46; 477/48
[58] Field of Search .................. 477/45, 46, 48

[56] References Cited

U.S. PATENT DOCUMENTS

| | | | |
|---|---|---|---|
| 4,656,587 | 4/1987 | Osanai et al. | 477/48 X |
| 4,689,745 | 8/1987 | Itoh et al. | 477/48 X |
| 4,793,217 | 12/1988 | Morisawa et al. | 477/48 X |
| 4,875,892 | 10/1989 | Sueda | 477/46 X |
| 4,976,170 | 12/1990 | Hayashi et al. | 477/46 X |
| 5,022,287 | 6/1991 | Murano et al. | 477/45 X |
| 5,050,455 | 9/1991 | Yamashita et al. | 477/46 |
| 5,259,272 | 11/1993 | Yamamoto et al. | 477/45 |

FOREIGN PATENT DOCUMENTS 62-4644  1/1987  Japan .

*Primary Examiner*—Charles A. Marmor
*Assistant Examiner*—Peter T. Kwon
*Attorney, Agent, or Firm*—Lowe, Price, LeBlanc & Becker

[57] ABSTRACT

The speed change ratio of a continuously variable transmission is controlled so that the actual speed change ratio approaches the basic speed change ratio at a predetermined rate of changing the speed by setting the basic speed change ratio based upon the opening degree of the accelerator and the vehicle speed. Here, when a change in the basic speed change ratio accompanying the accelerator operation is against the direction in which the actual speed change ratio approaches the basic speed change ratio, the speed is forcibly and temporarily changed to follow the change in the basic speed change ratio.

18 Claims, 8 Drawing Sheets

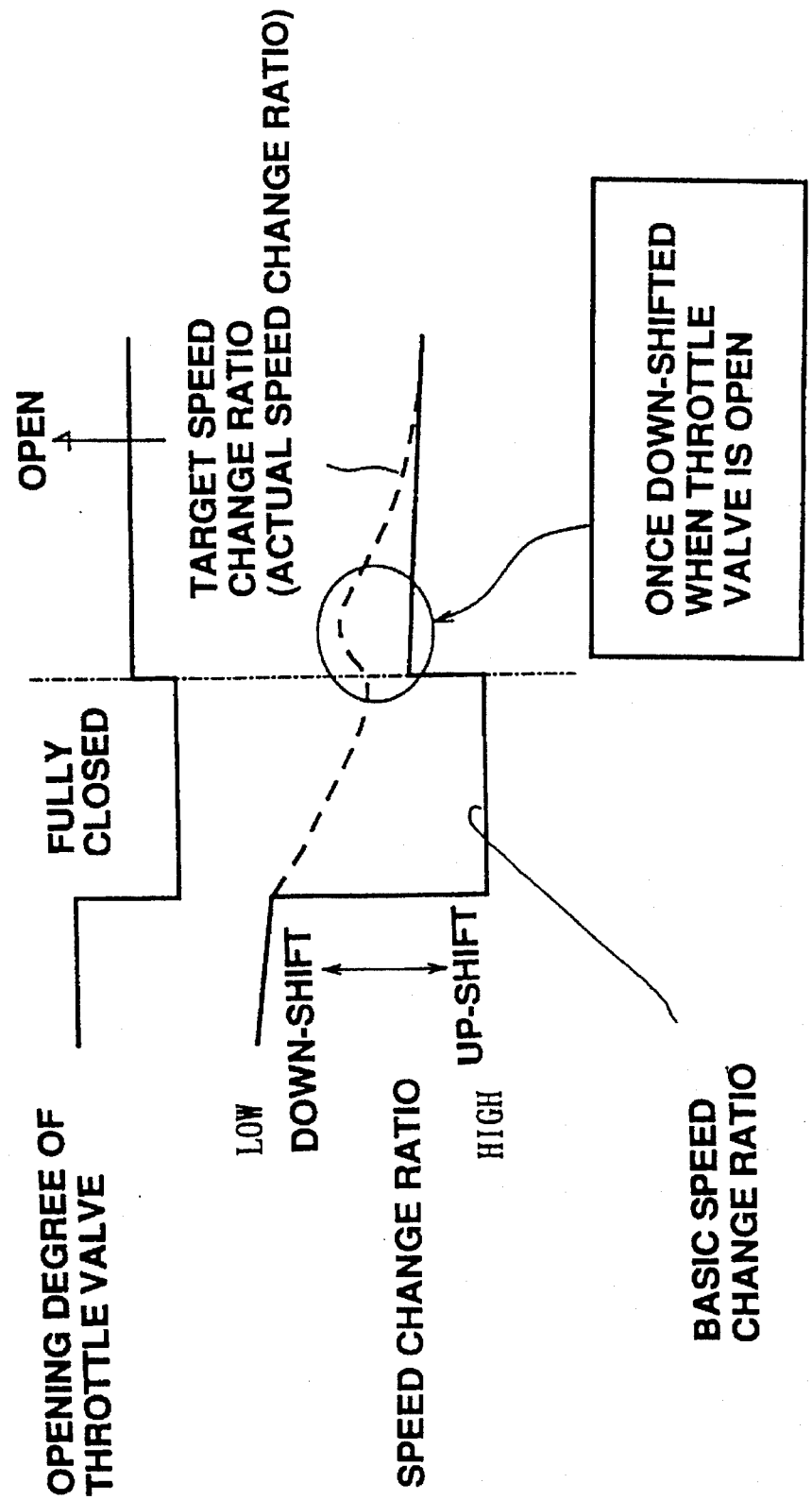

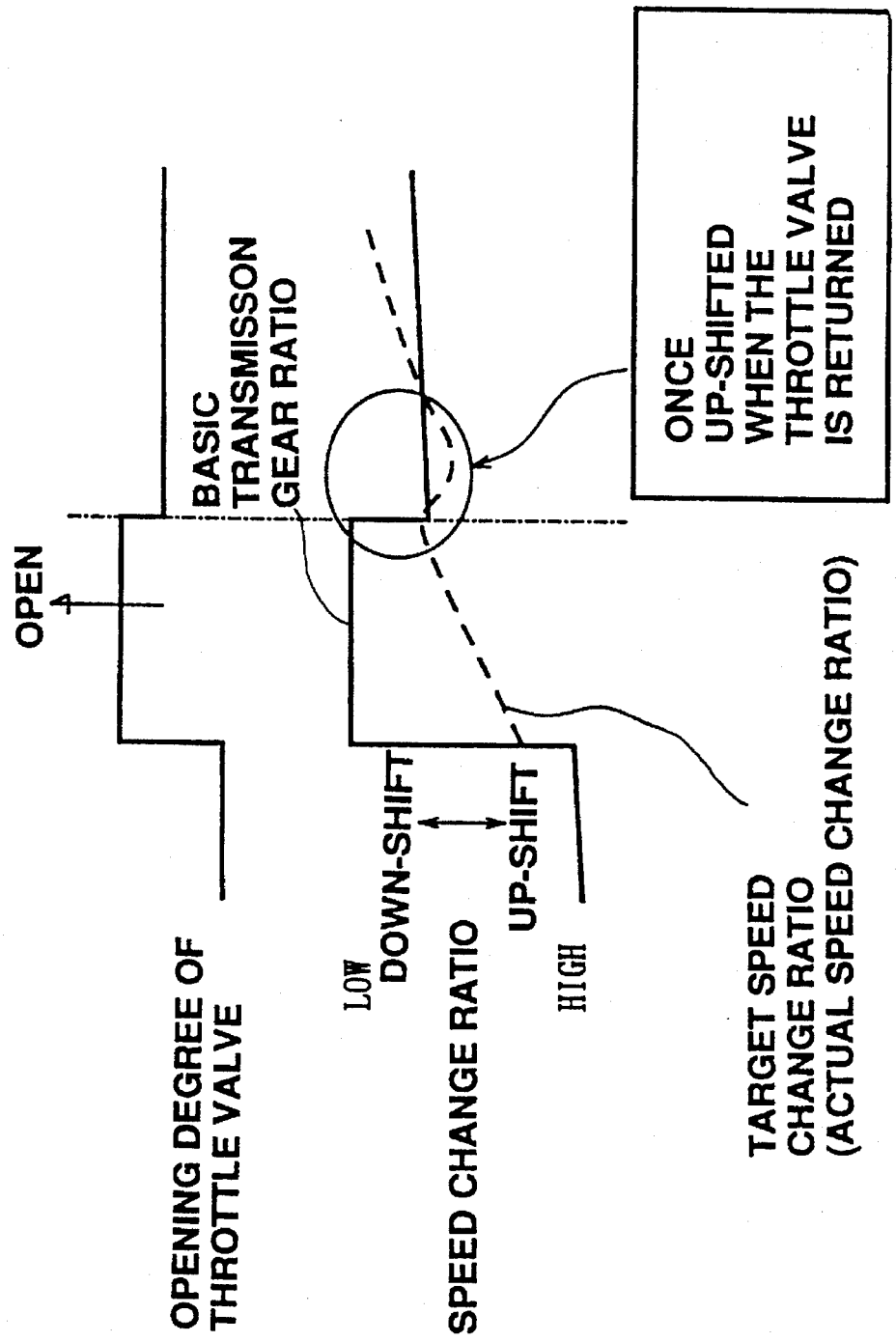

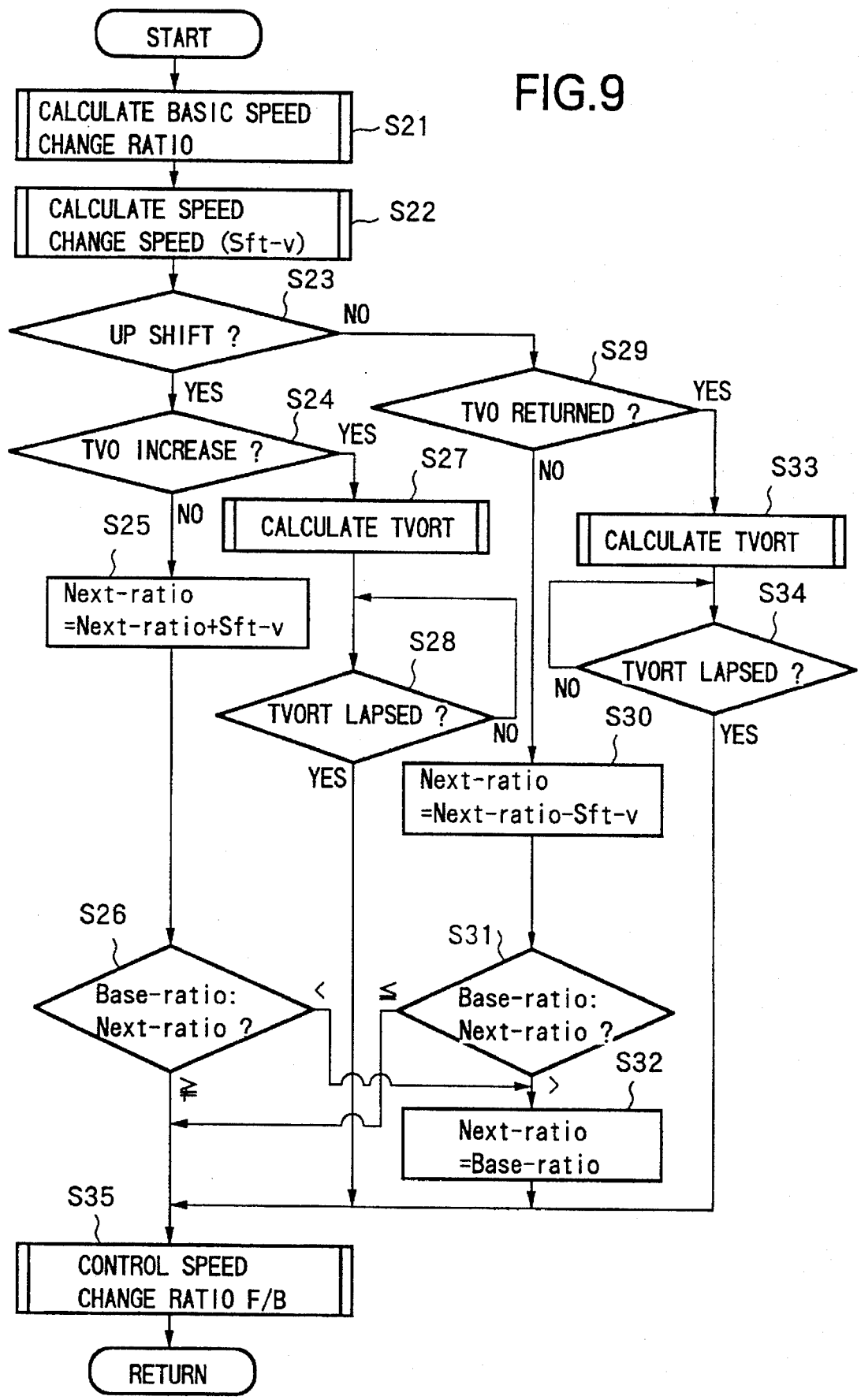

APPARATUS FOR CONTROLLING CONTINUOUSLY VARIABLE TRANSMISSION AND METHOD THEREOF

BACKGROUND OF THE INVENTION

1. Field of the Invention

The present invention relates to an apparatus for controlling a continuously variable transmission and to a method thereof. More specifically, the invention relates to technology for improving characteristics in the speed change control in response to the operation of the accelerator.

2. Related Art of the Invention

In the conventional continuously variable transmissions, it is accepted practice to set a basic speed change ratio based upon the opening degree of the throttle valve (opening degree of the accelerator) and the vehicle speed and to change the actual speed change ratio based upon a predetermined rate of changing the speed, so that the actual speed change ratio gradually approaches the basic speed change ratio (see Japanese Unexamined Patent Publication No. 62-4644).

In the continuously variable transmission as described above, when the opening degree of the throttle valve is changed causing the basic speed change ratio to greatly change stepwisely, then the actual speed change ratio starts approaching the basic speed change ratio that has changed at a predetermined rate of changing the speed. In particular, at the time of up-shifting in which the throttle valve (accelerator) is returned to the fully closed state, when the rate of changing the speed is too large, the driver feels during the high-speed cruising that the car is accelerating due to inertial torque. During the low-speed running, on the other hand, the driver feels that the car has suddenly lost the power. To alleviate such incompatible feeling, the actual speed change ratio must be brought gradually to the basic speed change ratio at a relatively slow rate of changing the speed.

Therefore, when the basic speed change ratio stepwisely changes toward the high-speed side as a result of returning the throttle valve to the fully closed state, the actual speed change ratio gradually approaches, at a relatively slow rate, the basic speed change ratio of the high-speed side that corresponds to the state where the throttle valve is fully closed. In a state where the actual speed change ratio is approaching the basic speed change ratio, when the throttle valve is opened (accelerator is trod) but when a change in the basic speed change ratio accompanying the opening operation of the throttle valve does not traverse the practical speed change ratio, the actual speed change ratio still remains on the side lower than the basic speed change ratio, and the speed change ratio continues to change toward the high-speed side (up-shifting).

Therefore, despite the driver attempts to accelerate the car by shifting to the low-speed side (down-shifting) by pressing the accelerator, the speed (up-shifting) continues to change toward the high-speed side independently of the intention of the driver who then feels incompatibility in driving.

Similarly, when the opening degree of the throttle valve is decreased as a result of returning back the accelerator while the basic speed change ratio is stepwisely changing toward the low-speed side in response to the press of the accelerator and while the actual speed change ratio is gradually approaching the basic speed change ratio of the low-speed side at a predetermined rate of changing the speed, the change of speed to the low-speed side (down-shifting) is continued despite the driver intends to change the speed (up-shifting) toward the high-speed side. The driver therefore feels incompatibility in driving.

SUMMARY OF THE INVENTION

The present invention was accomplished in view of the above-mentioned problems and its object is to provide an apparatus for controlling a continuously variable transmission which is capable of alleviating the driver from feeling incompatibility in driving that is caused by a change in the speed change ratio against the driver's intention for changing the speed, and a method thereof.

Another object of the present invention is to provide an apparatus for controlling a continuously variable transmission that is capable of reliably changing the speed in response to the driver's intention for changing the speed, and a method thereof.

Accordingly, the apparatus and method of controlling a continuously variable transmission of the present invention includes setting a basic speed change ratio depending upon the operation conditions inclusive of, at least, the opening degree of the accelerator, controlling the speed change ratio of the continuously variable transmission in a manner that an actual speed change ratio approached the basic speed change ratio at a predetermined rate of changing the speed, and, when the basic speed change ratio changes accompanying a change in the opening degree of the accelerator, temporarily blocking the actual speed change ratio from changing in a direction opposite to the direction in which the basic speed change ratio changes.

This constitution makes it possible to prevent the speed from changing (up-shifting) toward the high-speed side irrespective of a change in the basic speed change ratio that is caused by the fact that the actual speed change ratio is on the side lower than the basic speed change ratio despite the basic speed change ratio changes to the low-speed side (down-shifting direction).

Here, when the basic speed change ratio has changed in a direction opposite to the direction for controlling the speed change ratio in which the actual speed change ratio approaches the basic speed change ratio, the actual speed change ratio is temporarily and forcibly changed toward the same direction as the direction in which the basic speed change ratio changes, in order to temporarily prevent the actual speed change ratio from changing in a direction opposite to the direction in which the basic speed change ratio changes.

According to this constitution, the speed change ratio is forcibly changed in a direction that meets the operation of the accelerator, and the speed can be changed reflecting the driver's intention despite the basic speed change ratio changes in a direction opposite to the direction in which the actual speed change ratio approaches the basic speed change ratio.

It is further allowable to forcibly control the down-shifting operation accompanying the opening operation of the accelerator, which is a forcible change of speed to follow the change of the basic speed change ratio, only when the accelerator is opened from its fully closed state.

This is because during the up-shifting that is executed when the accelerator is returned back to the fully closed state, it becomes necessary to decrease the rate of changing the speed, which results in an increase in the delay for the driver's request for down-shifting. Therefore, the speed change ratio is forcibly changed in a direction that meets the operation of the accelerator to obtain desired effect.

Further, the constitution may include that the amount of change in the speed change ratio of when the actual speed change ratio is forcibly changed in the same direction as the direction in which the basic speed change ratio is changed, is set depending upon at least one of the opening degree of the accelerator, rate of operation of the accelerator and vehicle speed.

According to this constitution, the speed change ratio can be forcibly changed in precise response to the operation conditions and the driver's intention.

It is further allowable to temporarily block the actual speed change ratio from changing in a direction opposite to the direction in which the basic speed change ratio changes by forcibly holding the actual speed change ratio constant for a predetermined period of time instead of forcibly changing the actual speed change ratio in the same direction as the direction in which the basic speed change ratio changes.

According to this constitution, the speed change ratio does not change in at least a direction opposite to the direction intended by the driver, and the driver does not feel incompatibility in driving.

Here, the construction may include that the predetermined period of time for forcibly holding the actual speed change ratio constant is set based upon at least one of the opening degree of the accelerator, rate of operation of the accelerator and vehicle speed.

According to this constitution, the speed change ratio can be held constant for a period of time that varies in precise response to the operation conditions and the driver's intention.

The construction may further include that the rate of changing the speed at the time of controlling the speed change ratio of the continuously variable transmission so that the actual speed change ratio approaches the basic speed change ratio, is set depending upon a difference between the basic speed change ratio and the actual speed change ratio.

According to this constitution, the actual speed change ratio can be brought close to the basic speed change ratio maintaining good response and without causing overshooting.

It is further possible to set the rate of changing the speed to be,

Rate of changing the speed=TTINR/(ENGINR×Outrev× Cur-ratio)

based upon the actual speed change ratio Cur-ratio, target inertial torque TTINR set based on the engine torque, engine inertial torque ENGINR, and a number of rotations Outrev of the output shaft of the transmission.

This constitution makes it possible to normalize the rate of changing the speed at all times, without creating undesired feeling of acceleration, incompatible feeling such as sudden loss of power, or without producing shock caused by a change of speed.

In an ordinary speed control operation in which the speed change ratio of the continuously variable transmission is controlled so that the actual speed change ratio approaches the basic speed change ratio, a target speed change ratio may be set based upon a predetermined rate of changing the speed so as to approach the basic speed change ratio, and the feedback control operation may be carried out so that the actual speed change ratio comes into agreement with the target speed change ratio.

According to this constitution, the actual speed change ratio is allowed to smoothly change following the change in the basic speed change ratio.

Other objects and aspects of the present invention will become obvious from the following description of the embodiments in conjunction with the accompanying drawings.

BRIEF DESCRIPTION OF THE DRAWINGS

FIG. 6 is a time chart illustrating speed change ratio characteristics at the time of up-shifting according to the first embodiment;

FIG. 8 is a time chart illustrating the speed change ratio characteristics at the time of down-shifting according to the first embodiment;

FIG. 9 is a flow chart illustrating control routine for the speed change ratio according to a second embodiment;

DESCRIPTION OF THE PREFERRED EMBODIMENTS

Figure 1:
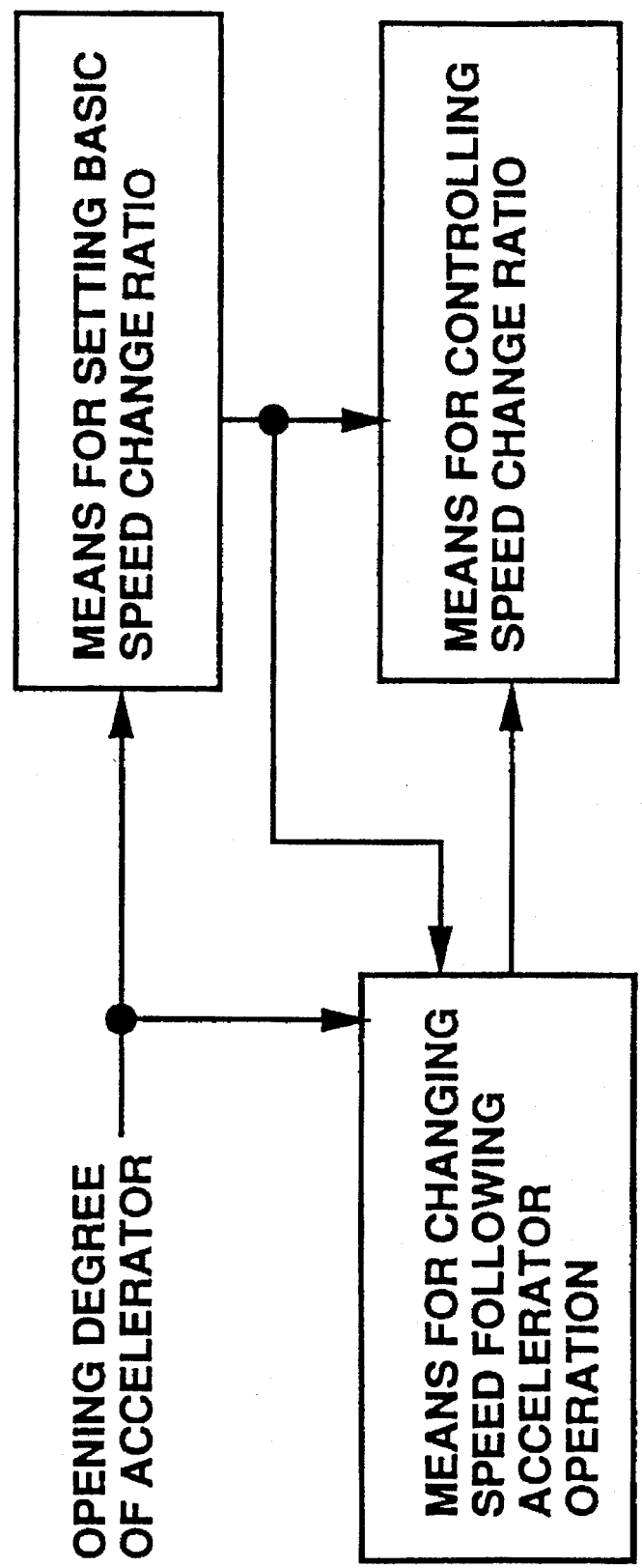
FIG. 1 is a block diagram illustrating a basic constitution of an apparatus for controlling a continuously variable transmission according to the present invention.

FIG. 1 is a block diagram illustrating a basic constitution of an apparatus for controlling a continuously variable transmission according to the present invention, wherein means for setting a basic speed change ratio sets a basic speed change ratio depending upon the operation conditions which include, at least, the opening degree of an accelerator, and means for controlling the rate of changing the speed controls the speed change ratio of the continuously variable transmission so that an actual speed change ratio approaches the basic speed change ratio at a predetermined rate of changing the speed. On the other hand, means for changing the speed following the accelerator operation temporarily blocks the actual speed change ratio from changing in a direction opposite to the direction in which the basic speed change ratio changes in case the basic speed change ratio is accompanying a change in the opening degree of the accelerator.

Concretely described below are embodiments of the apparatus for controlling the continuously variable transmission having the above-mentioned basic constitution and a method of controlling the continuously variable transmission.

Figure 2:
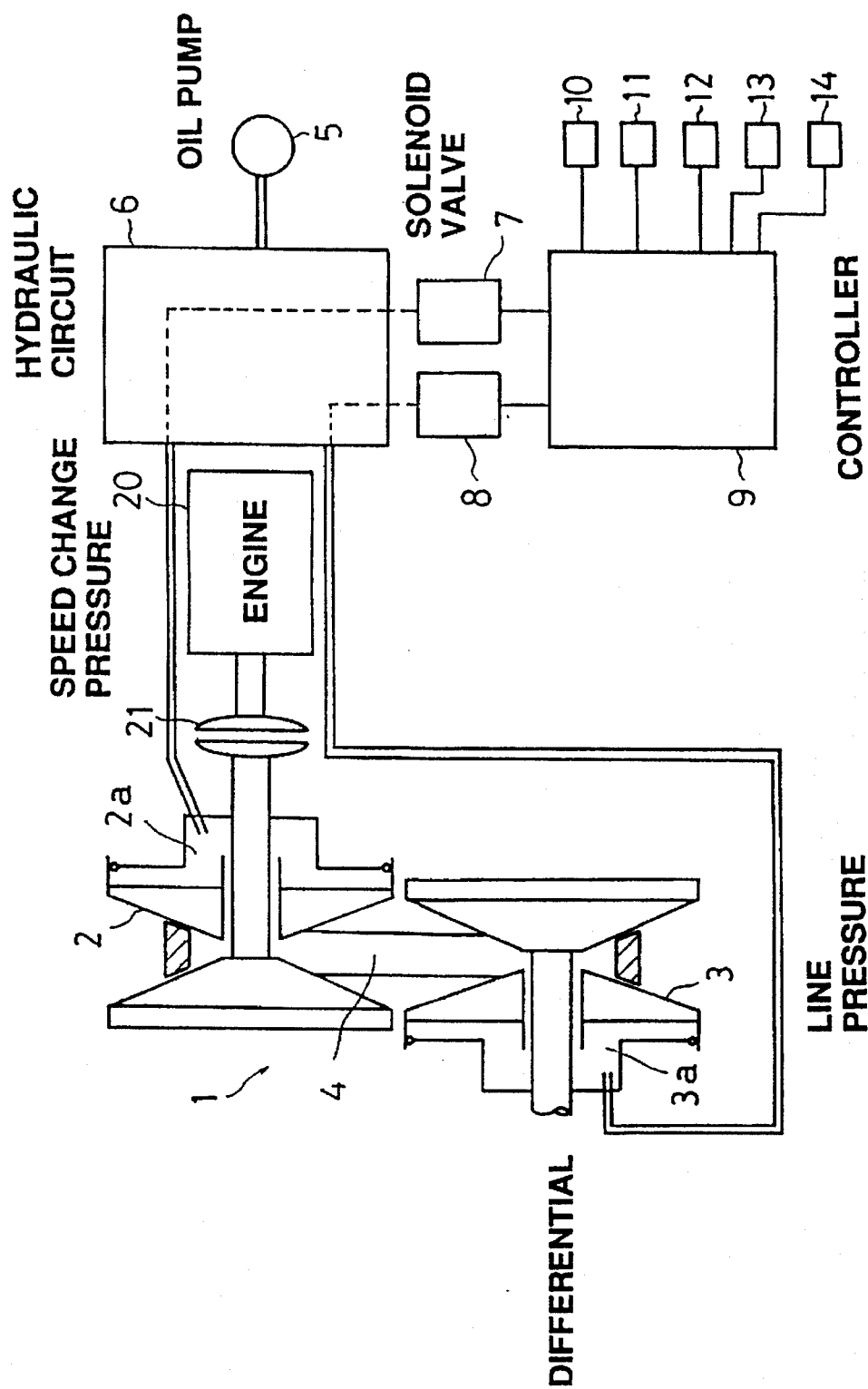
FIG. 2 is a schematic system diagram illustrating an embodiment of the present invention.

FIG. 2 is a diagram illustrating a system according to an embodiment of the present invention.

A continuously variable transmission for vehicle 1 that is combined with an engine 20 via a torque converter 21, is equipped with a primary pulley 2 on the side of the engine, a secondary pulley 3 on the side of the drive shaft (differential), and a belt 4 connected therebetween. The speed change ratio can be continuously varied by adjusting speed change pressure applied to the actuator 2a on the side of the primary pulley and line pressure applied to the actuator 3a on the side of the secondary pulley to thereby change the pulley ratio. Here, however, the continuously variable transmission may be of any other mechanism such as of a toroidal type, etc.

The speed change pressure and the line pressure are adjusted by being controlled by solenoid valves 7 and 8 having a function for relieving the hydraulic pressure in a hydraulic circuit 6 connected to an oil pump 5. The solenoid valves 7 and 8 are controlled by a controller 9.

Therefore, the speed change ratio can be continuously varied by controlling the speed change pressure and the line pressure using the solenoid valves 7 and 8 that are controlled by the controller 9.

In this embodiment, when the number of rotations input to the transmission is denoted by Ni and the number of rotations of the output shaft of the transmission is denoted by No, the speed change ratio is defined to be, Speed change ratio (i)=No (output number of rotations)/Ni (input number of rotations).

In order to control the speed change ratio, respective detection signals are input to the controller 9 from a vehicle speed sensor 10 that detects the vehicle speed VSP, a throttle sensor 11 that detects the throttle opening TVO, and an engine rotation sensor 12 that detects the number of rotations Ne of the engine. In this embodiment, the throttle valve is a mechanism that opens and closes being mechanically interlocked to the accelerator, and the throttle opening TVO corresponds to the opening degree of the accelerator.

The output number of rotations No can be obtained as a detection value of the vehicle speed sensor 10. The output number of rotations No(vehicle speed), however, can be detected by using a sensor 13 that detects the number of rotations of the secondary pulley instead of using the vehicle speed sensor 10. Similarly, the input number of rotations Ni can be obtained as the number of rotations Ne of the engine. The input number of rotations Ni, however, may be detected by using a sensor 14 that detects the number of rotations of the primary pulley.

In response to these signals, the controller 9 sets a basic speed change ratio (speed change ratio in the steady state) using a microcomputer embedded therein, sets a target speed change ratio that serves as a target when the basic speed change ratio is changed, and controls the speed by feedback controlling the solenoid valves 7 and 8, so that the actual speed change ratio is brought into agreement with the target speed change ratio.

Concretely speaking, the basic speed change ratio required under the operation conditions is set based on the vehicle speed VSP and the throttle opening TVO. When there is a difference between the basic speed change ratio and the target speed change ratio, the desired speed change ratio is stepwisely changed by each predetermined amount so that it gradually approaches the basic speed change ratio. Then, the solenoid valves 7 and 8 are feedback controlled, so that the actual speed change ratio of the transmission found from the input number of rotations Ni of the transmission and from the vehicle speed VSP (output number of rotations of the transmission), approaches the target speed change ratio.

Therefore, the rate of changing the speed is determined by a unit amount by which the target speed change ratio is stepwisely changed to approach the basic speed change ratio.

Controlling the speed by the controller 9 will now be described in detail with reference to the flow chart of FIG. 3.

Figure 3:
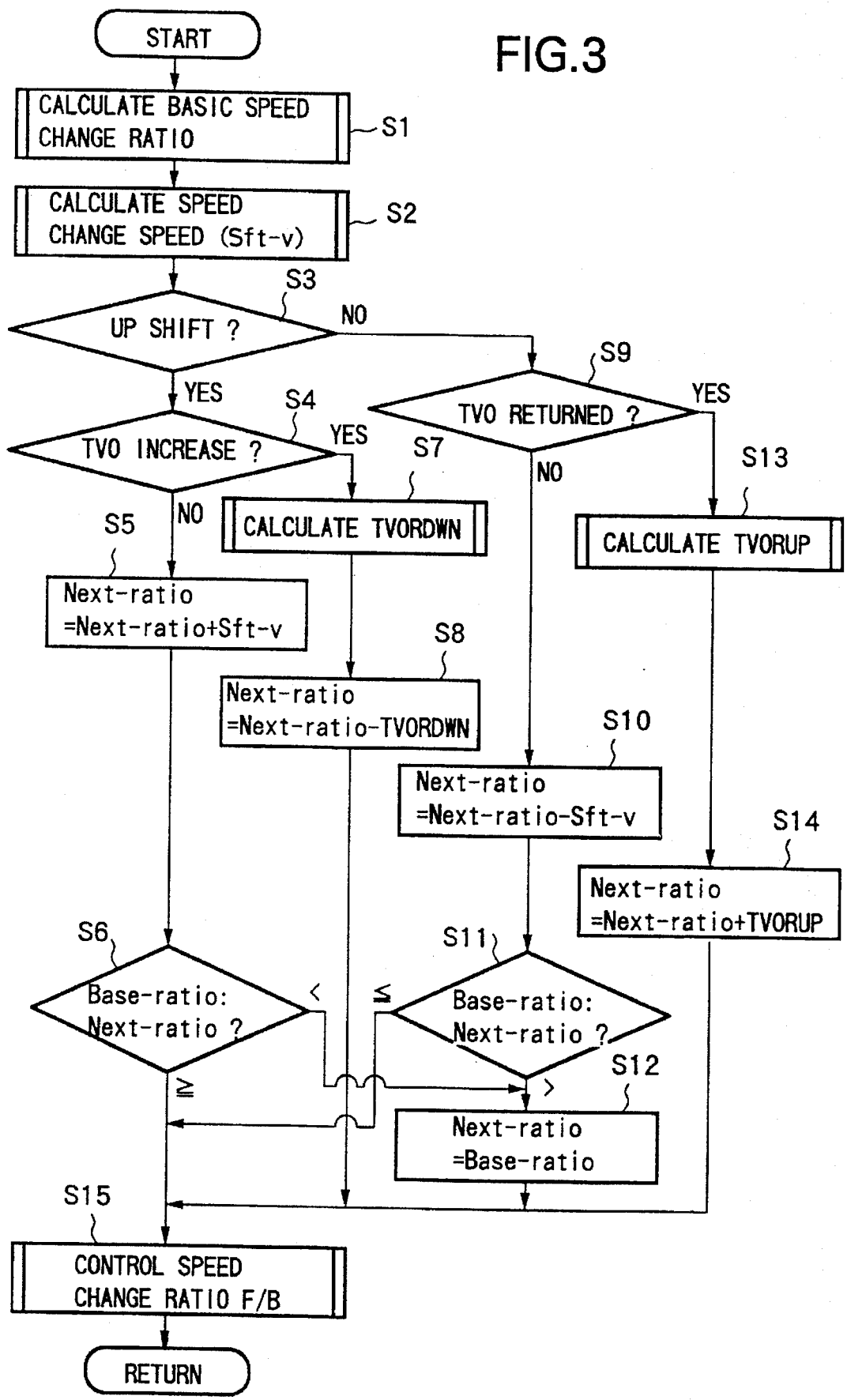
FIG. 3 is a flow chart illustrating a control routine for the speed change ratio according to a first embodiment.

In this embodiment as shown in the flow chart of FIG. 3, the controller 9 is provided with software functions of means for setting the basic speed change ratio, means for controlling the speed change ratio and means for changing the speed following the accelerator operation.

Figure 4:
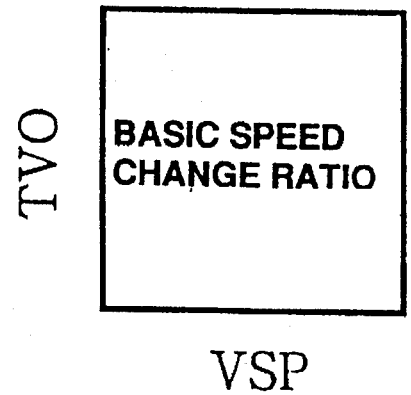
FIG. 4 is a diagram of a map illustrating a basic speed change ratio according to the embodiment.

Referring to the flow chart of FIG. 3, first, in step 1 (denoted by S in FIGS.), a basic speed change ratio Base-ratio (required speed change ratio corresponding to that of under the steady state) is computed. Concretely speaking, reference is made to a speed change ratio map (see FIG. 4) storing basic speed change ratios Base-ratio for each of the operation conditions sectionalized depending upon the throttle opening TVO and the vehicle speed VSP, to retrieve a basic speed change ratio Base-ratio that corresponds to the present throttle opening TVO and the vehicle speed VSP.

In step 2, a rate of changing the speed Sft-v is computed.

Figure 5:
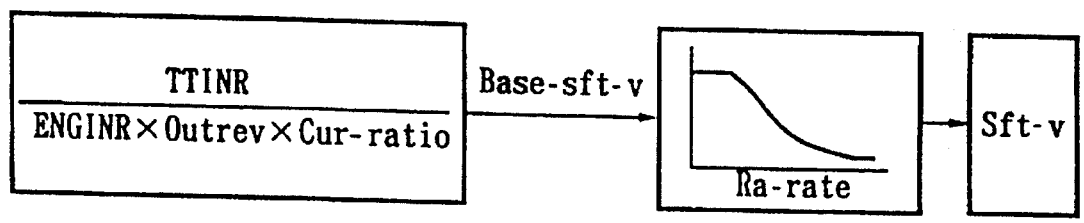
FIG. 5 is a diagram illustrating the mode of computing the rate of changing the speed according to the embodiment.

In this embodiment, a basic rate of changing the speed Base-Sft-v is computed as Base-Sft-v=TTINR/(ENGINR× Outrev×Cur-ratio) as shown in FIG. 5, based on the actual speed change ratio Cur-ratio computed based upon the input number of rotations Ni of the transmission and the number of rotations No of the output shaft of the transmission (denoted by Outrev in FIG. 5), a target inertial torque TTINR set depending upon an engine torque that is estimated from the throttle opening TVO and the number of rotations Ne of the engine, an engine inertial torque ENGINR given as a constant, and the output number of rotations No. Based upon the rate of progress of speed change Ra-rate set depending upon a difference between the actual speed change ratio Cur-ratio and the basic speed change ratio Base-ratio, furthermore, the basic rate of changing the speed Base-Sft-v is corrected more decreasingly as the actual speed change ratio Cur-ratio approaches the basic speed change ratio Base-ratio, in order to obtain a final rate of changing the speed Sft-v.

In step 3, it is judged whether it is a time when the up-shift control (change of speed toward the high-speed side) is requested or not based upon the comparison of the basic speed change ratio Base-ratio with the target speed change ratio Next-ratio. In this embodiment, a state where the target speed change ratio Next-ratio is smaller than the basic speed change ratio Base-ratio is the time when the up-shift operation control is required.

When it is judged in step 3 that the target speed change ratio Next-ratio is smaller than the basic speed change ratio Base-ratio and the up-shifting operation control is requested, the program proceeds to step 4 where it is judged whether the throttle opening TVO (opening degree of the accelerator) has increasingly changed, as a result of pressing the accelerator, so as to cause a change in the basic speed change ratio Base-ratio in a state where the up-shift control is requested.

When the throttle opening TVO has not increasingly changed as described above, the program proceeds to step 5 where the rate of changing the speed Sft-v is added to the target speed change ratio Nest-ratio in order to change the target speed change ratio Next-ratio toward the higher-speed side (toward the side of increasing the speed change ratio).

In step 6, it is judged whether the target speed change ratio Next-ratio is now greater than the basic speed change ratio Base-ratio or not as a result of increasing control of the target speed change ratio Next-ratio in step 5.

When the target speed change ratio Next-ratio is greater than the basic speed change ratio Base-ratio, the program proceeds to step 12 where the basic speed change ratio Base-ratio is set to the target speed change ratio Next-ratio. The program then proceeds to step 15 to prevent the up-shifting in a state where the target speed change ratio Next-ratio exceeds the basic speed change ratio Base-ratio.

When the target speed change ratio Next-ratio is equal to or smaller than the basic speed change ratio Base-ratio, the program proceeds to step 15 while leaving the target speed change ratio Next-ratio that has increased in step 5 unchanged.

At step 15, the speed change ratio is feedback controlled, so that the actual speed change ratio Cur-ratio computed based upon the input number of rotations Ni of the transmission and the output number of rotations No of the transmission is brought into agreement with the target speed change ratio Next-ratio.

When in step 4 it is judged that the throttle opening TVO that has increasingly changed so as to cause a change in the basic speed change ratio Base-ratio, the program proceeds to step 7 where a correction value TVORDWN is computed to forcibly correct the target speed change ratio Next-ratio toward the down-shifting direction (toward the direction to decrease the speed change ratio).

That is, when the throttle valve is opened as the accelerator is pressed by the driver in spite of a condition where the target speed change ratio Next-ratio is smaller than the basic speed change ratio Base-ratio and the up-shifting should be effected, since the driver requests the acceleration by the down-shifting, in order that the up-shifting will not be continued against the request for acceleration, the down-shift control is temporarily executed reflecting the intention of the driver (see FIG. 6).

Figure 10:
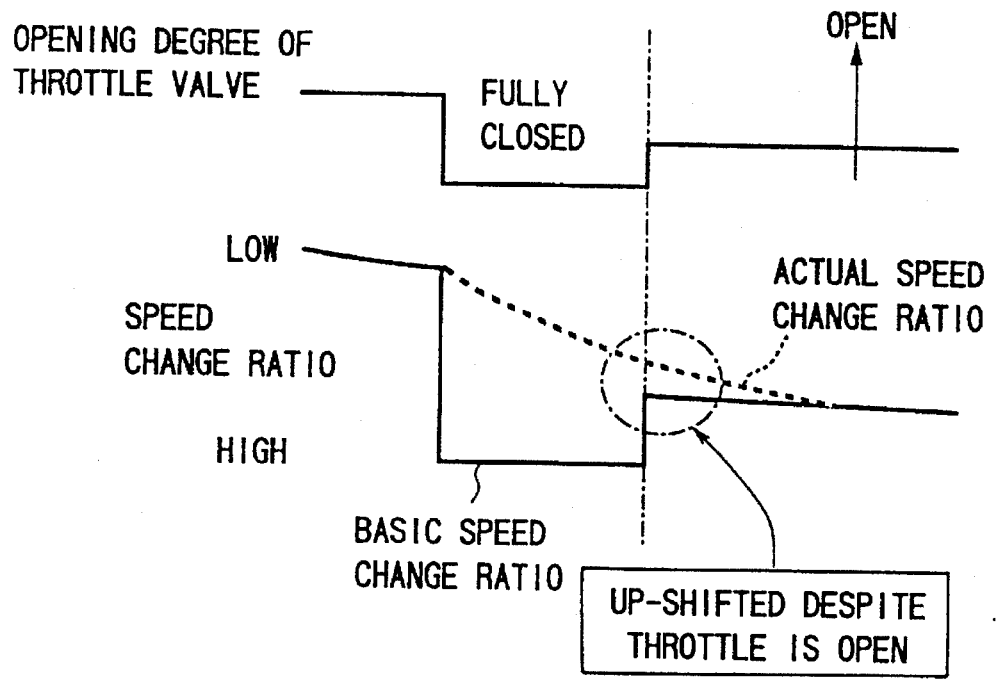
FIG. 10 is a time chart for explaining a problem of when the actual speed change ratio is controlled only in a direction in which it approaches the basic speed change ratio.

When there exists a large difference between the target speed change ratio Next-ratio and the basic speed change ratio Base-ratio, the up-shifting is continued based upon the fact that the target speed change ratio Next-ratio is still smaller than the basic speed change ratio Base-ratio, even if the accelerator is pressed during the up-shifting and the basic speed change ratio Base-ratio has changed toward the down-shifting direction to approach the target speed change ratio Next-ratio (see FIG. 10). Consequently, the drivers request for down-shifting is not quite reflected upon the speed change ratio; i.e., the driver feels incompatibility in driving.

Therefore, when the accelerator is pressed, which is the driver's request for down-shifting, the speed change ratio is temporarily and forcibly changed toward the down-shifting direction as shown in FIG. 6 even under the up-shifting condition in which the target speed change ratio Next-ratio is smaller than the basic speed change ratio Base-ratio, in order to change the speed in compliance with the driver's intention.

Figure 7:
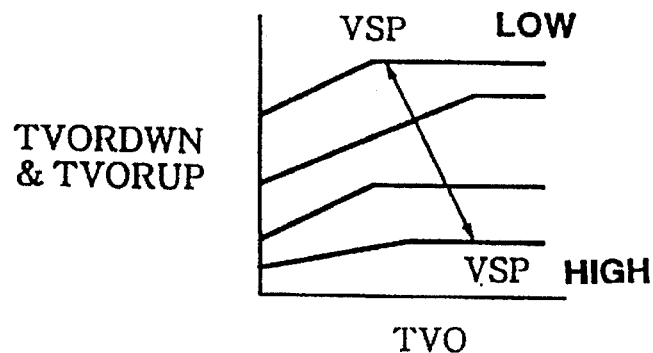
FIG. 7 is a diagram of a map illustrating values for correcting the speed change ratio according to the first embodiment.

Referring, for example, to FIG. 7, preferably, the correction values TVORDWN are stored in a map in advance being corresponded to throttle opening TVO and the vehicle speeds VSP, so that a correction value TVORDWN that meets a change in the basic speed change ratio Base-ratio that is set depending upon the throttle opening TVO and the vehicle speed VSP is set.

The driver's request for acceleration is reflected upon the rate of operating the accelerator. Therefore, the correction value TVORDWN may be set depending upon the rate of opening the throttle valve that corresponds to the rate of opening the accelerator.

In step 8, the correction value TVORDWN set in step 7 is substracted from the target speed change ratio Next-ratio of up to the previous time, to correct the target speed change ratio Next-ratio toward the down-shifting direction.

Similarly, when it is judged in step 3 that the down-shifting operation control is being executed, it is then judged whether the accelerator is returned back (throttle valve is dosed) that corresponds to the request for up-shifting (step 9) during the down-shifting operation control. When the accelerator is not returned, the target speed change ratio Next-ratio is gradually decreased by the rate of changing the speed Sft-v in an ordinary manner to execute the down-shifting operation control so that the target speed change ratio approaches the basic speed change ratio Base-ratio (steps 10, 11). When the accelerator is returned back representing the request for up-shifting (a change of the basic speed change ratio Base-ratio toward the up-shifting) during the down-shift control (step 9), a correction value TVORUP is set to temporarily execute the up-shifting that corresponds to the above-mentioned operation (step 13, see FIG. 7), and the target speed change ratio Next-ratio is forcibly increased based upon the correction value TVORUP (step 14).

Therefore, when the accelerator is returned back representing the request for the up-shifting during the down-shifting operation, the up-shifting is executed in response to the return operation as shown in FIG. 8, so that the speed is actually changed in response to the driver's request for up-shifting. Like the correction value TVORDWN mentioned above, the correction value TVORUP can be set to correspond to a change in the basic speed change ratio as shown in FIG. 7, and can be further set in response to the rate of closing the throttle valve. When the throttle valve is quickly closed, it can be considered that the driver is trying to quickly decelerate. When the throttle valve is quickly closed, therefore, it is preferable that the up-shifting by the correction value TVORUP is not effected to a large extent from the standpoint of applying the engine brake.

Figure 11:
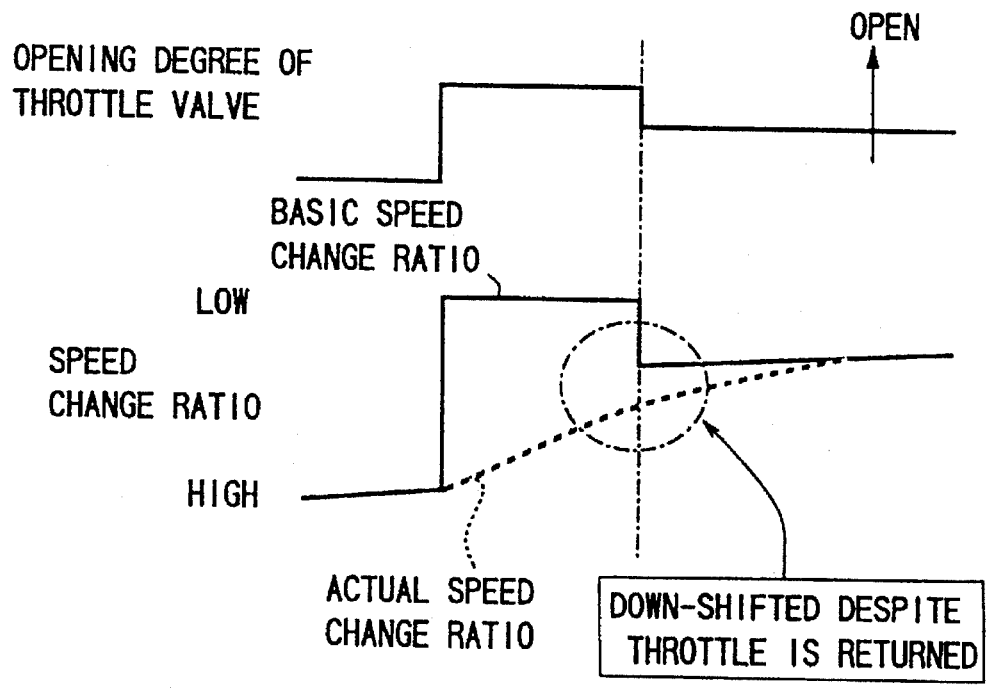
FIG. 11 is a time chart for explaining a problem of when the actual speed change ratio is controlled only in a direction in which it approaches the basic speed change ratio.

According to this constitution, when the accelerator is operated (opening degree of the throttle valve is changed) requesting a change in the speed change ratio in a direction opposite to the up-shifting or the down-shifting which is being executed and in which the target speed change ratio Next-ratio gradually approaches the basic speed change ratio Base-ratio depending upon the rate of changing the speed Sft-v, the speed change is carried out temporarily and forcibly in response to the above request. As shown in FIGS. 10 or 11, therefore, despite the driver expects the down-shifting or the up-shifting by the operation of the accelerator the speed change in a direction against the expected direction is prevented from being continued. Accordingly, the speed is positively changed in compliance with the driver's intention, and the driver does not find it incompatible to drive.

In the above-mentioned embodiment, the temporary down-shifting operation control in response to the accelerator that is pressed during the up-shifting operation control may be executed only when the throttle valve is opened from the fully closed state. This is because, the rate of changing the speed must be delayed particularly during the up-shifting of when the accelerator is returned back to the fully closed state. In this case, therefore, there is a large delay to the request for down-shifting. During this period, there is a high possibility that the request for down-shifting by pressing the accelerator is produced.

In the above-mentioned embodiment (first embodiment), the speed change ratio is temporarily changed in a direction corresponding to the accelerator operation when the accelerator is pressed during the up-shifting or when the accelerator is returned during the down-shifting. However, when the accelerator is operated requesting a change in the speed change ratio in the opposite direction during the up-shifting or the down-shifting, the speed change ratio may be forcibly held for a predetermined period of time instead of positively changing the speed change ratio in response to the accelerator operation, so that the speed change ratio will not be changed in a direction opposite to the direction that corresponds to the accelerator operation, in order to alleviate incompatible drive feeling.

The embodiment (second embodiment) for holding the speed change ratio is shown in a flow chart of FIG. 9.

In the flow chart of FIG. 9, the ordinary up-shifting operation control and the down-shifting operation control (steps other than the steps 27, 28, 33 and 34) are the same as those mentioned with reference to the flow chart of FIG. 3. Therefore, the following description mainly concerns the control operation of when the accelerator is operated representing a change of the basic speed change ratio in a direction opposite to the direction in which the actual speed change ratio approaches the basic speed change ratio.

In the flow chart of FIG. 9, when it is judged in step 24 that the accelerator is pressed requesting the down-shifting during the up-shifting operation control, the program proceeds to step 27 where a holding time TVORT corresponding to the request for down-shifting is set.

It is preferable that the holding time TVORT is set to be longer with an increase in the basic speed change ratio Base-ratio that accompanies the pressing of the accelerator or with an increase in the rate of pressing the accelerator (rate of opening the throttle valve). Here, however, the holding time TVORT may be set as a fixed value.

In step 28, the lapse of the holding time TVORT is measured. During this period, the program is not permitted to proceed to a step 25. Therefore, the actual speed change ratio of just before the request for down-shifting that is produced by pressing the accelerator is held constant for the above-mentioned period of holding time TVORT. When the down-shifting is requested by pressing the accelerator, therefore, the speed change ratio control is blocked at least in the opposite direction, to alleviate incompatible drive feeling.

Similarly, when the request for up-shifting is produced by the return of the accelerator (step 29) during the down-shifting operation control (step 23), a holding time TVORT that corresponds to the request for up-shifting is set (step 33), and the speed change ratio is forcibly held for the period of this holding time TVORT (step 34), so that the down-shifting against the driver's intention is blocked and therefore, the driver finds it little incompatible to drive.

I claim:

1. An apparatus for controlling a continuously variable transmission comprising:
   basic speed change ratio setting means for setting a basic speed change ratio depending upon operation conditions inclusive of, at least, the opening degree of an accelerator;
   speed change ratio control means for controlling a speed change ratio of the continuously variable transmission in a manner that an actual speed change ratio approaches said basic speed change ratio at a predetermined rate of changing the speed; and
   means for changing the speed following the accelerator operation which, when said basic speed change ratio is changed accompanying a change in the opening degree of the accelerator, temporarily blocks the actual speed change ratio from changing in a direction opposite to the direction in which said basic speed change ratio changes.

2. An apparatus for controlling a continuously variable transmission according to claim 1, wherein said means for changing the speed following the accelerator operation temporarily and forcibly changes the actual speed change ratio toward the same direction as the direction in which said basic speed change ratio changes when the basic speed change ratio changes in a direction opposite to the direction in which the actual speed change ratio approaches the basic speed change ratio.

3. An apparatus for controlling a continuously variable transmission according to claim 2, wherein said means for changing the speed following the accelerator operation controls forcibly the down-shifting operation accompanying the accelerator opening operation only when the accelerator is opened form the fully closed state.

4. An apparatus for controlling a continuously variable transmission according to claim 2, wherein said means for changing the speed following the accelerator operation sets the amount of change in the speed change ratio of when the actual speed change ratio is forcibly changed in the same direction as the direction in which the basic speed change ratio is changed based upon at least one of the opening degree of the accelerator, rate of operating the accelerator and vehicle speed.

5. An apparatus for controlling a continuously variable transmission according to claim 1, wherein said means for changing the speed following the accelerator operation forcibly holds the actual speed change ratio for a predetermined period of time when the basic speed change ratio changes in a direction opposite to the direction in which the actual speed change ratio approaches the basic speed change ratio.

6. An apparatus for controlling a continuously variable transmission according to claim 5, wherein said means for changing the speed following the accelerator operation sets a predetermined period of time in which the actual speed change ratio is forcibly held constant, based upon at least one of the opening degree of the accelerator, rate of operating the accelerator and vehicle speed.

7. An apparatus for controlling a continuously variable transmission according to claim 1, wherein said speed change ratio control means sets the rate of changing the speed based upon a difference between the basic speed change ratio and the actual speed change ratio.

8. An apparatus for controlling a continuously variable transmission according to claim 1, wherein said speed change ratio control means sets the rate of changing the speed as, $$\text{Rate of changing the speed} = TTINR/(ENGINR \times Outrev \times Cur\text{-}ratio)$$

based upon the actual speed change ratio (Cur-ratio), a target inertial torque (TTINR) set based on the engine torque, an engine inertial torque (ENGINR) and a number of rotations (Outrev) of the output shaft of the transmission.

9. An apparatus for controlling a continuously variable transmission according to claim 1, wherein said speed change ratio control means sets the target speed change ratio based upon a predetermined rate of changing the speed so as to approach the basic speed change ratio, and carries out the feedback control operation so that the actual speed change ratio comes into agreement with the target speed change ratio.

10. A method of controlling a continuously variable transmission comprising; setting a basic speed change ratio depending upon the operation conditions inclusive of, at least, the opening degree of an accelerator, controlling a speed change ratio of the continuously variable transmission in a manner that an actual speed change ratio approaches said basic speed change ratio at a predetermined rate of changing the speed, and when said basic speed change ratio changes accompanying a change in the opening degree of the accelerator, temporarily blocking the actual speed change ratio from changing in a direction opposite to the direction in which said basic speed change ratio changes.

11. A method of controlling a continuously variable transmission according to claim 10, wherein the actual speed change ratio is temporarily and forcibly changed toward the same direction as the direction in which said basic speed change ratio changes when the basic speed change ratio changes in a direction opposite to the direction in which the actual speed change ratio approaches the basic speed change ratio.

12. A method of controlling a continuously variable transmission according to claim 11, wherein the forcible down-shifting operation accompanying the accelerator opening operation is controlled only when the accelerator is opened from the fully closed state.

13. A method of controlling a continuously variable transmission according to claim 11, wherein the amount of change in the speed change ratio of when the actual speed change ratio is forcibly changed in the same direction as the direction in which the basic speed change ratio changes, is set based upon at least one of the opening degree of the accelerator, rate of operating the accelerator and vehicle speed.

14. A method of controlling a continuously variable transmission according to claim 10, wherein the actual speed change ratio is forcibly held for a predetermined period of time when the basic speed change ratio changes in a direction opposite to the direction in which the actual speed change ratio approaches the basic speed change ratio.

15. A method of controlling a continuously variable transmission according to claim 14, wherein the predetermined period of time for forcibly holding the actual speed change ratio constant is set based upon at least one of the opening degree of the accelerator, rate of operating the accelerator and vehicle speed.

16. A method of controlling a continuously variable transmission according to claim 10, wherein the rate of changing the speed is set based upon a difference between the basic speed change ratio and the actual speed change ratio.

17. A method of controlling a continuously variable transmission according to claim 10, wherein the rate of changing the speed is set as,

*Rate of changing the speed=TTINR/(ENGINR×Outrev×Cur-ratio)* based upon the actual speed change ratio (Cur-ratio), a target inertial torque (TTINR) set based on the engine torque, an engine inertial torque (ENGINR) and a number of rotations (Outrev) of the output shaft of the transmission.

18. A method of controlling a continuously variable transmission according to claim 10, wherein the target speed change ratio is set based upon a predetermined rate of changing the speed so as to approach the basic speed change ratio, and the feedback control operation is carried out so that the actual speed change ratio comes into agreement with the target speed change ratio.

* * * * *